(12) United States Patent
Fukuda

(10) Patent No.: US 10,341,549 B2
(45) Date of Patent: Jul. 2, 2019

(54) IMAGE PROCESSING APPARATUS, IMAGE PROCESSING METHOD, AND IMAGE CAPTURE APPARATUS CAPABLE OF REDUCING AN IMAGE DATA AMOUNT

(71) Applicant: CANON KABUSHIKI KAISHA, Tokyo (JP)

(72) Inventor: Koichi Fukuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 15/272,654

(22) Filed: Sep. 22, 2016

(65) Prior Publication Data

US 2017/0094152 A1 Mar. 30, 2017

(30) Foreign Application Priority Data

Sep. 30, 2015 (JP) ................................. 2015-194398

(51) Int. Cl.
*H04N 5/232* (2006.01)
*H04N 5/369* (2011.01)

(52) U.S. Cl.
CPC ..... *H04N 5/23212* (2013.01); *H04N 5/23222* (2013.01); *H04N 5/3696* (2013.01)

(58) Field of Classification Search
CPC ........... H04N 5/23212; H04N 5/23222; H04N 5/3696
See application file for complete search history.

(56) References Cited

U.S. PATENT DOCUMENTS

| 4,410,804 A | 10/1983 | Stauffer | |
|---|---|---|---|
| 2008/0219599 A1* | 9/2008 | Hopkins | H04N 1/00347 382/312 |
| 2009/0140131 A1* | 6/2009 | Utagawa | G02B 3/0056 250/226 |
| 2012/0050566 A1* | 3/2012 | Cote | H04N 5/23212 348/224.1 |
| 2013/0083230 A1* | 4/2013 | Fukuda | H01L 27/14627 348/340 |
| 2013/0156311 A1* | 6/2013 | Choi | H04N 9/642 382/166 |

OTHER PUBLICATIONS

Ren Ng, et al., "Light Field Photography with a Hand-Held Plenoptic Camera" Stanford Tech Report CTSR Feb. 2005.

* cited by examiner

*Primary Examiner* — Luong T Nguyen
(74) *Attorney, Agent, or Firm* — Cowan, Liebowitz & Latman, P.C.

(57) ABSTRACT

Disclosed are an image processing apparatus that can efficiently suppress the data amount of data indicating a spatial distribution and an angular distribution of light intensity and a control method of the same. The image processing apparatus obtains data indicating the spatial distribution and the angular distribution of the intensity of light beams that have passed through partial pupil areas obtained by dividing the exit pupil of an imaging optical system into a predetermined number. The image processing apparatus then reduces the bit depth or the number of tones of signals constituting the data based on the predetermined number.

5 Claims, 8 Drawing Sheets

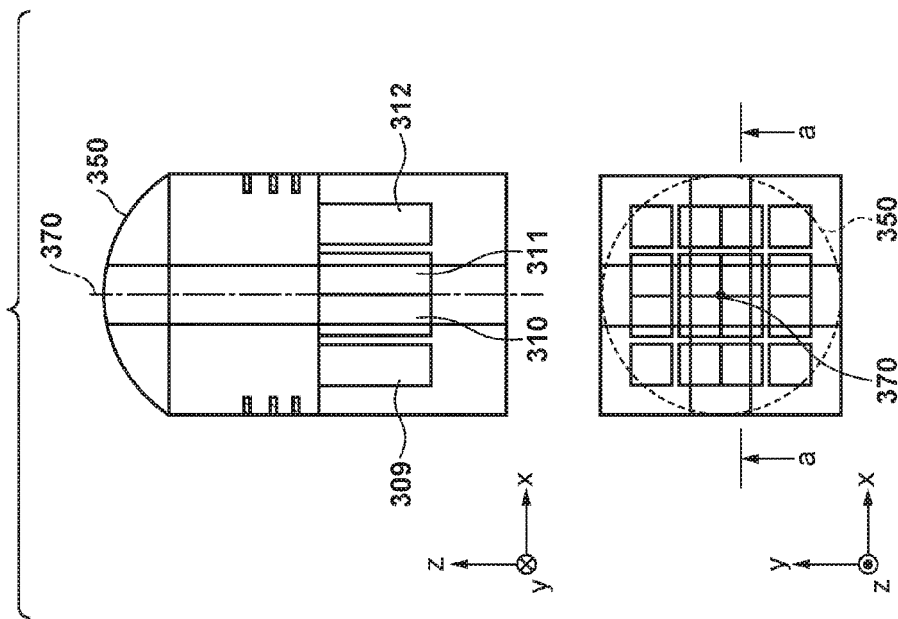
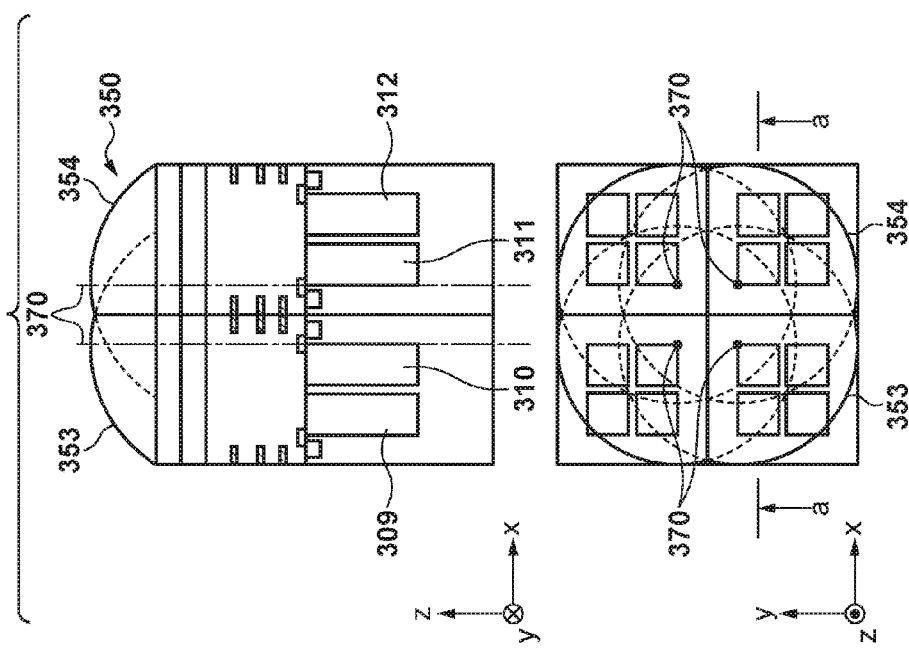

IMAGE PROCESSING APPARATUS, IMAGE PROCESSING METHOD, AND IMAGE CAPTURE APPARATUS CAPABLE OF REDUCING AN IMAGE DATA AMOUNT

BACKGROUND OF THE INVENTION

Field of the Invention

The present invention relates to an image processing apparatus and an image processing method, and in particular relates to a technique for reducing an image data amount. The present invention also relates to an image capture apparatus and a control method thereof.

Description of the Related Art

There are known image capture apparatuses that divide the exit pupil of an imaging lens (imaging optical system) into a plurality of pupil areas, and can generate a plurality of images each corresponding to one pupil area with one shooting operation (U.S. Pat. No. 4,410,804). These plurality of images have a parallax therebetween (parallax images), and are thus information indicating the spatial distribution and angular distribution of light intensity, and have properties similar to those of data called light field (LF) data.

Ren. Ng, et al., "Light Field Photography with a Hand-Held Plenoptic Camera" (Stanford Tech Report CTSR 2005-02, 2005.4.20) discloses a refocusing technique for changing an in-focus area of a captured image after shooting, by using LF data to reconstruct an image in an imaging plane (virtual imaging plane) that is different from the imaging plane at the time of shooting.

In the case of a configuration in which a pupil area is divided using an image sensor in which the photoelectric conversion area of one pixel is divided into a plurality of (n) portions, a maximum of n parallax images are generated in one shooting operation. Therefore, the data amount of the image is n times an image that is generated in the case where the pupil area is not divided (normal image). Furthermore, if the parallax images are combined and an image corresponding to a normal image is added in consideration of compatibility with a device that cannot handle parallax images, the data amount will be n+1 times the normal image.

SUMMARY OF THE INVENTION

The present invention has been made in light of the issue of such conventional techniques, and provides an image processing apparatus and an image processing method that can efficiently suppress the data amount of data indicating the spatial distribution and angular distribution of light intensity.

According to an aspect of the present invention, there is provided an image processing apparatus comprising: an obtaining unit configured to obtain data that is based on light beams that have passed through partial pupil areas obtained by dividing an exit pupil of an imaging optical system into a predetermined number $N_p$; and a reduction unit configured to reduce a bit depth or a number of tones of signals constituting the data based on the predetermined number $N_p$.

According to another aspect of the present invention, there is provided an image capture apparatus comprising: an image sensor that generates data indicating a spatial distribution and an angular distribution of an intensity of light beams that have passed through partial pupil areas obtained by dividing an exit pupil of an imaging optical system into a predetermined number $N_p$; and an image processing apparatus comprising: an obtaining unit configured to obtain the data generated by the image sensor; and a reduction unit configured to reduce a bit depth or a number of tones of signals constituting the data based on the predetermined number $N_p$.

According to another aspect of the present invention, there is provided an image capture apparatus, comprising: an image sensor in which a plurality of imaging pixels are arranged, each of the plurality of imaging pixels including a plurality of subpixels, and each of the plurality of subpixels receiving a light beam that has passed through a different one of partial pupil areas obtained by dividing an exit pupil of an imaging optical system into a predetermined number $N_p$; and a generation unit configured to generate captured image data obtained by combining signals of the plurality of subpixels for each of the imaging pixels, and light field data constituted by the signals of the plurality of subpixels, wherein when generating the light field data, the generation unit determines a bit depth or a number of tones of the signals of the plurality of subpixels based on the predetermined number $N_p$ so as to be smaller than that of pixel signals of the captured image data.

According to another aspect of the present invention, there is provided an image processing method executed by an image processing apparatus, the method comprising: obtaining data that is based on light beams that have passed through partial pupil areas obtained by dividing an exit pupil of an imaging optical system into a predetermined number $N_p$; and reducing a bit depth or a number of tones of signals constituting the data based on the predetermined number $N_p$.

According to still another aspect of the present invention, there is provided a control method of an image capture apparatus having an image sensor in which a plurality of imaging pixels are arranged, wherein each of the plurality of imaging pixels includes a plurality of subpixels, and each of the plurality of subpixels receives a light beam that has passed through a different one of partial pupil areas obtained by dividing an exit pupil of an imaging optical system into a predetermined number $N_p$, the control method comprising: generating, in accordance with a mode, captured image data obtained by combining signals of the plurality of subpixels for each of the imaging pixels, and light field data constituted by the signals of the plurality of subpixels, wherein, in the generating, when generating the light field data, a bit depth or a number of tones of the signals of the plurality of subpixels is determined based on the predetermined number $N_p$ so as to be smaller than that of pixel signals of the captured image data.

According to further aspect of the present invention, there is provided a non-transitory computer-readable storage medium storing a program for causing a computer to function as an image processing apparatus comprising: an obtaining unit configured to obtain data that is based on light beams that have passed through partial pupil areas obtained by dividing an exit pupil of an imaging optical system into a predetermined number $N_p$; and a reduction unit configured to reduce a bit depth or a number of tones of signals constituting the data based on the predetermined number $N_p$.

According to still further aspect of the present invention, there is provided a non-transitory computer-readable storage medium storing a program for causing a computer of an image capture apparatus comprises an image sensor in which a plurality of imaging pixels are arranged, each of the plurality of imaging pixels including a plurality of subpixels, and each of the plurality of subpixels receiving a light beam that has passed through a different one of partial pupil areas obtained by dividing an exit pupil of an imaging optical system into a predetermined number $N_p$, to function as a generation unit configured to generate captured image data obtained by combining signals of the plurality of subpixels for each of the imaging pixels, and light field data constituted by the signals of the plurality of subpixels, wherein when generating the light field data, the generation unit determines a bit depth or a number of tones of the signals of the plurality of subpixels based on the predetermined number $N_p$, so as to be smaller than that of pixel signals of the captured image data.

Further features of the present invention will become apparent from the following description of exemplary embodiments with reference to the attached drawings.

BRIEF DESCRIPTION OF THE DRAWINGS

FIGS. 4A and 4B are schematic explanatory diagrams of a pixel structure that is optically roughly equivalent to a pixel structure in the embodiments of the present invention.

DESCRIPTION OF THE EMBODIMENTS

Exemplary embodiments of the present invention will now be described in detail in accordance with the accompanying drawings. Note that in the embodiments that will be described below, a configuration will be described in which the present invention is applied to an image capture apparatus as an example of an image processing apparatus, but the configuration related to image capture is not essential to the present invention. For example, a configuration may be adopted in which light field data that has already been recorded as an image file in a certain format is obtained from a storage apparatus or an external apparatus. Light field data (LF data) is an example of data indicating the spatial distribution and angular distribution of the light intensity.

Overall Configuration

Figure 1:
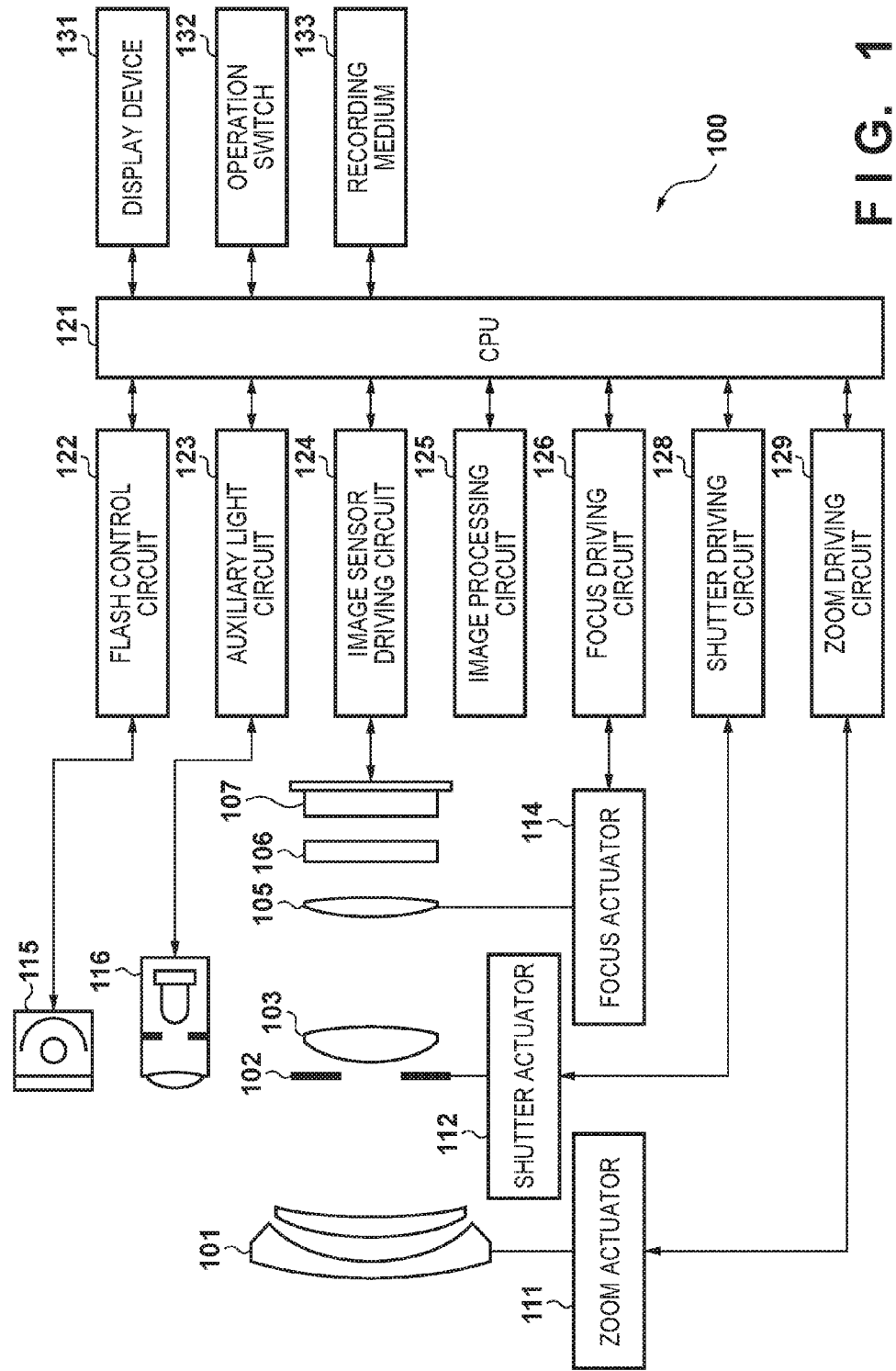
FIG. 1 is a diagram showing an example of a function configuration of a digital still camera serving as an example of an image processing apparatus according to embodiments of the present invention.

FIG. 1 is a diagram showing an example of the function configuration of a digital still camera 100 (hereinafter, simply referred to as the camera 100) as an example of the image capture apparatus according to the embodiments of the present invention.

A first lens group 101 is arranged at the front of an imaging optical system, and is held so as to be movable back and forth along the optical axis. A shutter 102 functions not only as a shutter for controlling an exposure duration at the time of capturing still images, but also as an aperture for adjusting the light amount at the time of image capture by adjusting the opening diameter. A second lens group 103 arranged rearward of the shutter 102 (image sensor side) can move back and forth along the optical axis integrally with the shutter 102, and realizes a zoom function together with the first lens group 101.

A third lens group 105 is a focus lens, and can move back and forth along the optical axis. The first to third lens groups 101, 103 and 105 and the shutter 102 constitute the imaging optical system. An optical low pass filter 106 is arranged in front of an image sensor 107, and reduces false colors and moire that occur in captured images. The image sensor 107 is constituted by a two-dimensional CMOS image sensor and peripheral circuitries. In this embodiment, the image sensor 107 is a two-dimensional single-plate color image sensor in which a plurality of light receiving elements (pixels), namely, m (>1) light receiving elements in the horizontal direction and n (>1) light receiving elements in the vertical direction, are two dimensionally arranged, and primary color mosaic filters in a Bayer array are formed on the light receiving elements. The color filters restrict the wavelength of transmission light that is incident on the light receiving elements in units of pixels.

A zoom actuator 111 rotates a cam barrel (not illustrated) so as to drive at least one of the first lens group 101 and the second lens group 103 along the optical axis in accordance with control by a zoom driving circuit 129, and realizes a zoom function. A shutter actuator 112 controls the opening diameter of the shutter 102 so as to adjust an imaging light amount, and controls an exposure duration at the time of capturing a still image, in accordance with control by a shutter driving circuit 128.

A focus actuator 114 drives the third lens group 105 along the optical axis in accordance with control by a focus driving circuit 126.

A flash 115 is preferably a flash lighting apparatus that uses a xenon tube, but may be an illumination apparatus provided with an LED that continuously emits light. An AF auxiliary light output unit 116 projects an image of a mask having a predetermined opening pattern via a light projecting lens, and improves focus detection ability with respect to an object having a low luminance and an object having a low contrast.

A CPU 121 controls the overall operations of the camera 100, and has a calculation unit, a ROM, a RAM, an A/D converter, a D/A converter, a communication interface circuit and the like (not illustrated). The CPU 121 executes a program stored in the ROM so as to control various circuits of the camera 100 and realizes the functions of the camera 100 such as AF, AE, image processing and recording.

A flash control circuit 122 controls lighting of the flash 115 in synchronization with an image capture operation. An auxiliary light circuit 123 controls the lighting of the AF auxiliary light output unit 116 at the time of a focus detection operation. An image sensor driving circuit 124 controls the operations of the image sensor 107, and also A/D converts image signals read out from the image sensor 107 and outputs the image signals to the CPU 121. An image processing circuit 125 applies image processing such as gamma conversion, color interpolation, scaling and JPEG encoding/decoding to image signals.

The focus driving circuit 126 moves the third lens group 105 along the optical axis by driving the focus actuator 114 based on a focus detection result, and performs focus adjustment. The shutter driving circuit 128 controls the opening diameter and open/close timing of the shutter 102 by driving the shutter actuator 112. The zoom driving circuit 129 drives the zoom actuator 111 in accordance with a zoom operation that is input by an image taker pressing a zoom operation switch included in operation switches 132, for example.

A display device 131 is an LCD or the like, and displays information regarding an image capture mode of the camera 100, preview images before image capture and images for checking after image capture, information regarding an in-focus state at the time of focus detection, and the like. The operation switches 132 include a power switch, a release (image capture trigger) switch, the zoom operation switch, an image capture mode selection switch and the like. A recording medium 133 is a removable semiconductor memory card, for example, and records captured images.

Image Sensor

Figure 2:
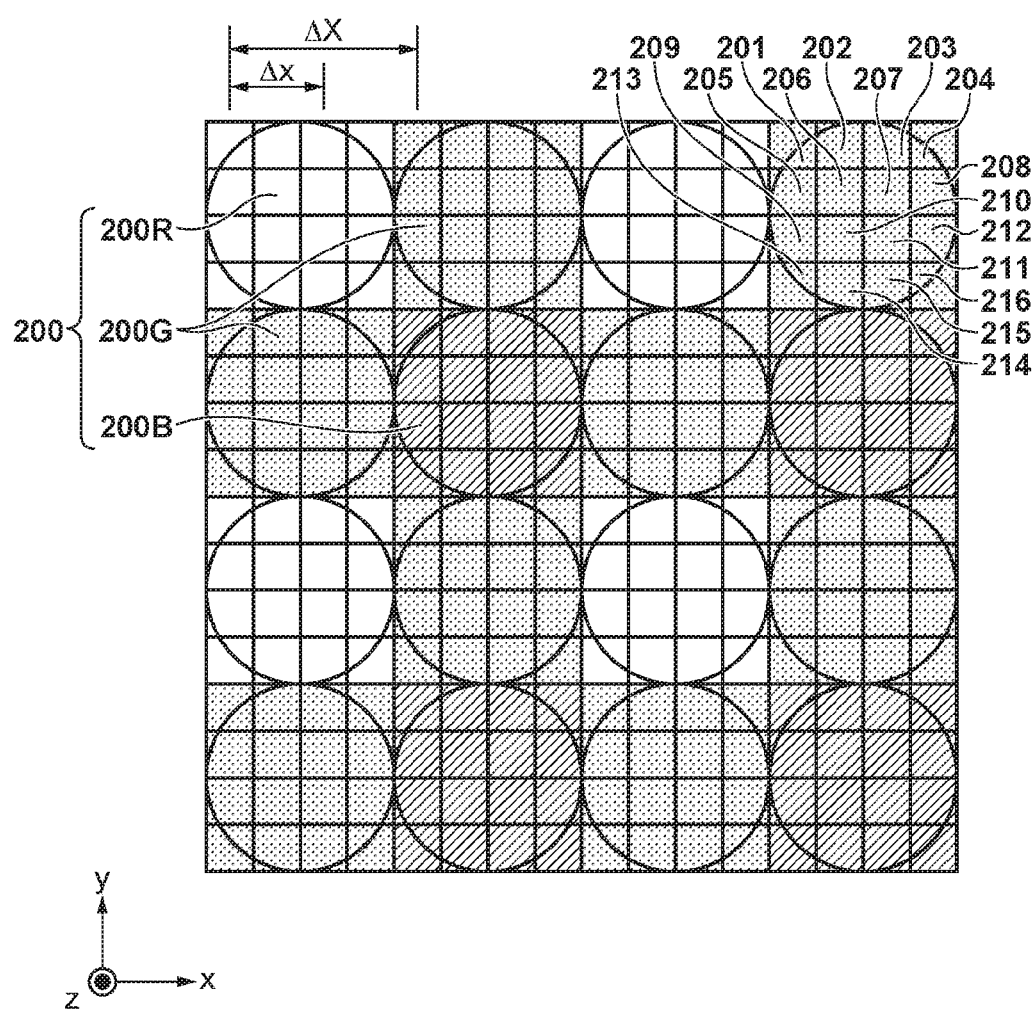
FIG. 2 is a schematic diagram of pixel arrangement in the embodiments of the present invention.

FIG. 2 is a diagram schematically showing an arrangement example of imaging pixels and subpixels in the image sensor 107, and representatively shows an area in which the imaging pixels are arranged in an array of 4 horizontal pixels×4 vertical pixels. In this embodiment, the photoelectric conversion area of each imaging pixel is divided into four in the vertical direction and four in the horizontal direction, and each of the divided photoelectric conversion areas functions as a subpixel. Therefore, FIG. 2 can be said to show an area in which the subpixels are arranged in an array of 16 horizontal subpixels×16 vertical subpixels. As will be described later, in the image sensor 107 of this embodiment, a plurality of imaging pixels each having a plurality of subpixels are arranged, and the subpixels arranged in each imaging pixel individually receive light beams that have passed through mutually different exit partial pupil areas (partial pupil areas) of the imaging optical system.

In this embodiment, a pixel group 200 having 2×2 pixels at the upper left in FIG. 2 corresponds to the unit of repetition of primary color filters in a Bayer array provided in the image sensor 107. Accordingly, a pixel 200R having an R (red) spectral sensitivity is arranged at the upper left, pixels 200G having a G (green) spectral sensitivity are arranged at the upper right and lower left, and a pixel 200B having a B (blue) spectral sensitivity is arranged at the lower right. Also, as representatively indicated by the pixel at the upper right in FIG. 2, in each imaging pixel, $N_\theta \times N_\theta$ (here, $N_\theta=4$) subpixels 201 to 216 are two-dimensionally arranged.

By arranging a large number of the 4×4 imaging pixel (16×16 subpixel) array shown in FIG. 2 in the image capture plane of the image sensor 107, a plurality of parallax images (light field data) can be obtained. In addition, subpixels also function as focus detection pixels, and thus focus detection that employs an image capture plane phase difference detection method using various positions of the screen as focus detection areas can be performed. In this embodiment, it is assumed that the imaging pixel pitch (period) $\Delta X$ is 9.2 μm both horizontally and vertically, and the number of effective pixels $N_{LF}$ is 3900 columns horizontally×2600 rows vertically=10.14 mega pixels. Also, it is assumed that the subpixel period $\Delta x$ is 2.3 μm both horizontally and vertically, and the number of effective subpixels N is 15600 columns horizontally×10400 rows vertically=approximately 1.62 giga subpixels.

Figure 3A:
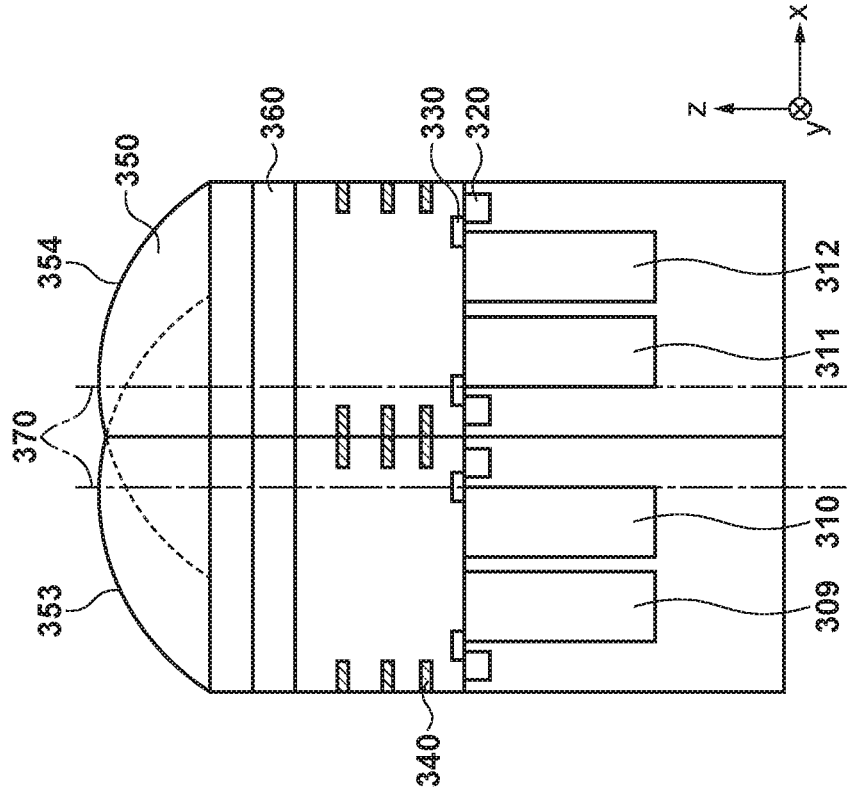
FIGS. 3A and 3B are respectively a schematic plan view and a schematic cross-sectional view of a pixel in the embodiments of the present invention.
Figure 3B:
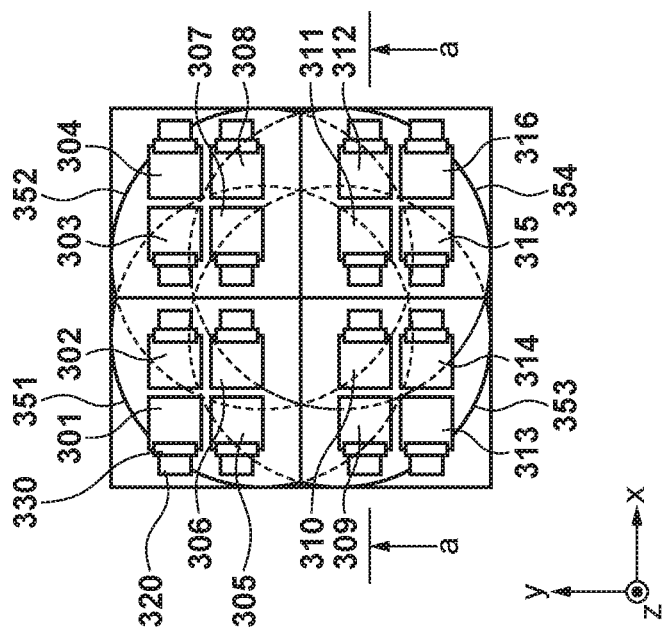

FIG. 3A shows a plan view of one of the imaging pixels shown in FIG. 2 (here, the pixel 200G is used, but the pixels 200B and 200R have the same configuration) when viewed from a light receiving surface side (+Z side) of the image sensor, and FIG. 3B shows a cross-sectional view of the a-a cross-section in FIG. 3A when viewed from the −y side.

As shown in FIGS. 3A and 3B, in the pixel 200G of this embodiment, a microlens 350 for collecting incident light is formed on the light-receiving side of the pixel, and photoelectric conversion portions 301 to 316 obtained by dividing the pixel into $N_\theta$ (four) in the x direction and $N_\theta$ (four) in the y direction are formed. The photoelectric conversion portions 301 to 316 respectively correspond to the subpixels 201 to 216. Note that the microlens 350 is formed into a shape formed by $N_\theta$ (four) sub microlenses 351 to 354 being in line contact with adjacent sub microlenses. The optical axes (apexes) of the sub microlenses 351 to 354 are eccentric from the centers of areas obtained by dividing the pixel area into 2×2=4, toward the center of the pixel area. A broken line 370 in FIG. 3B indicates the optical axes (apexes) of the sub microlenses 353 and 354.

The photoelectric conversion portions 301 to 316 may be a pin structure photodiode having an intrinsic layer sandwiched between a p-type layer and an n-type layer, or may be a pn junction photodiode with the intrinsic layer omitted as necessary.

In each pixel, a color filter 360 is formed between the microlens 350 and the photoelectric conversion portions 301 to 316. As necessary, the spectral transmittance of the color filter may be changed for each subpixel, or the color filter may be omitted.

Light that is incident to the pixel 200G shown in FIGS. 3A and 3B is collected by the microlens 350, separated by the color filter 360, and after that, received by the photoelectric conversion portions 301 to 316.

In the photoelectric conversion portions 301 to 316, after electron-hole pairs are generated in accordance with the amount of the received light, and separated by a depletion layer, the electrons having a negative electric charge are accumulated on the n-type layer, and the holes are discharged outside of the image sensor 107 via a p-type layer 300 connected to a constant voltage source (not illustrated).

An electrostatic capacity portion (floating diffusion: FD) 320 and a transfer gate 330 are formed adjacent to each of the photoelectric conversion portions 301 to 316. Furthermore, wiring layers 340 that also function as light-shielding layers are formed between the microlens 350 and the electrostatic capacity portion (FD) 320. The electrostatic capacity portion (FD) 320 is arranged in an area in which the light collected by the microlens 350 is not incident.

The electrons accumulated on the n-type layers of the photoelectric conversion portions 301 to 316 are transferred to the electrostatic capacity portion (FD) 320 via the transfer gates 330, and are converted into voltage signals. Note that the voltage signals that underwent conversion in the electrostatic capacity portion (FD) 320 are output to column circuits provided in the image sensor 107 for the respective columns. The column circuits each include a capacity element for sampling the voltage signals, an amplifier for amplifying the signal amplitude, an A/D converter for converting the voltage signals into digital signals, and the like. Note that in addition to these, a memory for storing the digital signals may be provided in each of the column circuits. Moreover, in the column circuit of the image sensor 107 in this embodiment, a single slope type A/D converter for comparing a voltage signal value with a reference voltage (ramp signals) that changes over time is provided as an A/D converter.

Furthermore, the electrons accumulated in the photoelectric conversion portions 301 to 316 can be individually read out, but can also be added together in predetermined units and read out. Units for readout include a unit of two horizontal pixels and two vertical pixels, a unit of four pixels only in the vertical or horizontal position direction and the like. In this case, the addition may be performed by the electrostatic capacity portion (FD) 320 or each of the column circuits.

FIG. 4A shows a schematic cross-sectional view and a schematic plan view of the pixel shown in FIGS. 3A and 3B. Also, FIG. 4B shows a schematic cross-sectional view and a schematic plan view of a pixel optically roughly equivalent to the pixel shown in FIGS. 3A and 3B. In the pixel shown in FIG. 4A, if reconstruction is performed such that all of the optical axes (apexes) 370 of the sub microlenses 351 to 354 that constitute the microlens 350 overlap, the configuration in FIG. 4B is obtained. By constituting the microlens 350 with the four sub microlenses 351 to 354, it is possible to optically suppress the influence from the separation bands between the photoelectric conversion portions 306, 307, 310 and 311 that are near the center of the pixel area, the electrostatic capacity portion (FD) 320, and the regions of the wiring layers 340 also serving as light-shielding layers.

Figure 5:
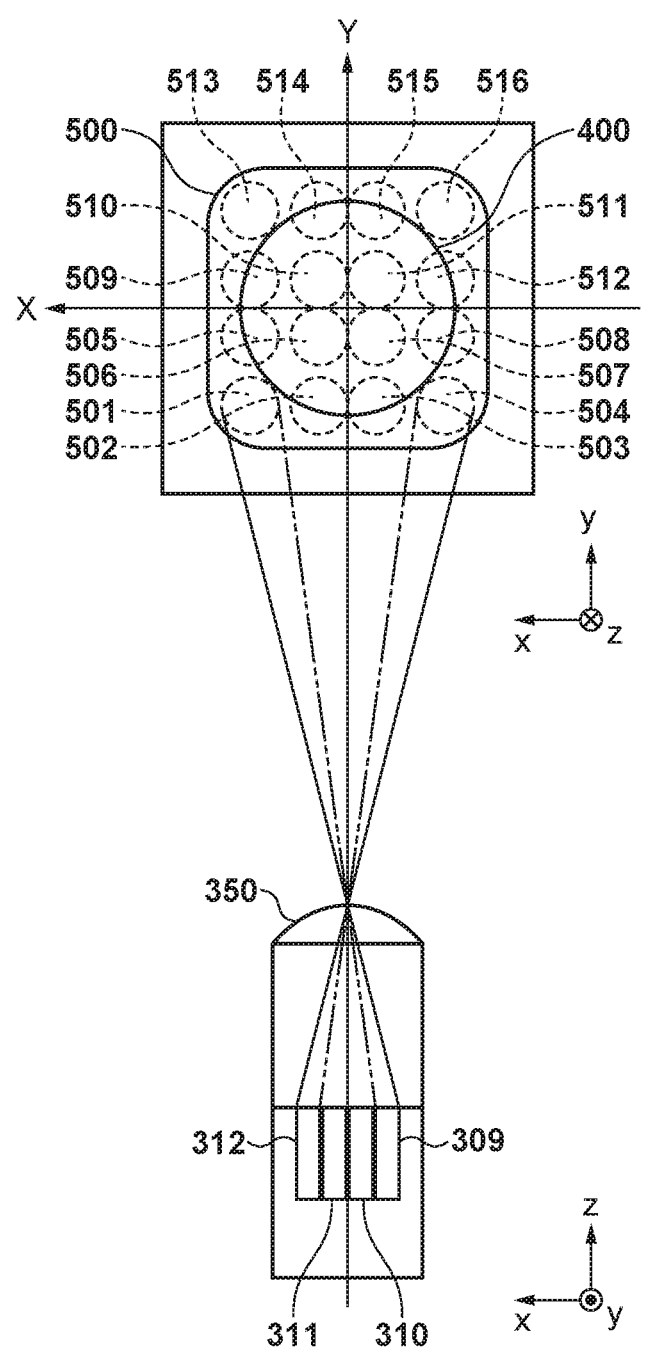
FIG. 5 is a schematic explanatory diagram of a pixel and pupil division in the embodiments of the present invention.

FIG. 5 schematically shows pupil division of the photoelectric conversion portion in the pixel structure shown in FIG. 4B. In FIG. 5, the x-axis and y-axis in the cross-sectional view are inversed from those in FIGS. 3A and 3B and FIGS. 4A to 4B so as to correspond to the coordinate axes of the exit pupil plane.

The image sensor 107 is arranged near the imaging plane of the imaging optical system, and light beams from the object pass through an exit pupil 400 of the imaging optical system, and are incident to individual photoelectric conversion areas (subpixels). Partial pupil areas 501 to 516 have a substantially conjugate relationship with the light receiving surfaces of the photoelectric conversion portions 301 to 316 (the subpixels 201 to 216) obtained by $N_\theta \times N_\theta$ (4×4) division, due to the microlens 350. Therefore, the partial pupil areas 501 to 516 represent partial pupil areas in which the individual photoelectric conversion portions (subpixels) can receive light. Moreover, a pupil area 500 is a pupil area in which light can be received by the entire pixel 200G that includes the photoelectric conversion portions 301 to 316 (the subpixels 201 to 216) divided into $N_\theta \times N_\theta$ (4×4).

The pupil distance from the imaging plane to the exit pupil plane is several tens of millimeters, while the diameter of the microlens 350 is several micrometers, and thus the aperture value of the microlens 350 is tens of thousands, thereby causing diffraction blur at the level of several tens of millimeters. Therefore, the images on the light receiving surfaces of the photoelectric conversion portions 301 to 316 have the pupil intensity distribution (the incident angle distribution of the light receiving rate), rather than becoming distinct pupil areas or partial pupil areas.

Figure 6A:
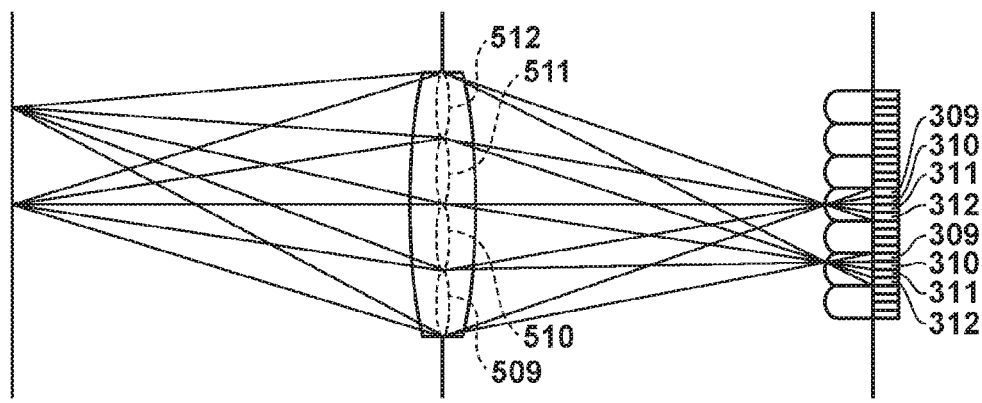
FIGS. 6A to 6C are diagrams respectively illustrating a relationship between an image sensor and pupil division, a relationship between a defocus amount and an image shift amount between parallax images, and a range in which refocusing is possible, according to the embodiments of the present invention.

FIG. 6A shows a schematic diagram showing the correspondence relation between the image sensor and the pupil division according to this embodiment. Here, the partial pupil areas 509 to 512 are representatively shown. Light beams that passed through the partial pupil areas 509 to 512 are incident to the subpixels 209 to 212 of the image sensor at angles different from each other and is received at the photoelectric conversion portions 309 to 312, respectively. Similarly, light beams that passed through the partial pupil areas 513 to 516 are received at the photoelectric conversion portions 313 to 316, light beams that passed through the partial pupil areas 505 to 508 is received at the photoelectric conversion portions 305 to 308, and light beams that passed through the partial pupil areas 501 to 504 is received at the photoelectric conversion portions 301 to 304.

Therefore, the photoelectric conversion portions 301 to 316 (the subpixels 201 to 216) that share the microlens 350 receive light beams that passed through mutually different partial pupil areas. The output read from the subpixels 201 to 216 is LF data indicating the spatial distribution and angular distribution of the light intensity.

A parallax image corresponding to one specific partial pupil area among the partial pupil areas 501 to 516 of the imaging optical system can be obtained by collecting one corresponding signal out of those of the subpixels 201 to 216 from the data of a plurality of imaging pixels that constitute the LF data. For example, if the signal of the subpixel 209 (the photoelectric conversion portion 309) is collected from the data of the imaging pixels, it is possible to obtain a parallax image that corresponds to the partial pupil area 509 of the imaging optical system and has a resolution formed of the number of effective pixels. The same can be applied to the other subpixels. Therefore, in this embodiment, a plurality of parallax images (of which number is equal to the number of partial pupil areas $N_p = N_\theta \times N_\theta$), corresponding to the respective partial pupil areas can be obtained by an image sensor in which a plurality of pixels each having a plurality of subpixels for receiving light beams that pass through mutually different partial pupil areas are arrayed.

Moreover, it is possible to generate a captured image having a resolution of the number of effective pixels, by adding (combining) all the signals of the subpixels 201 to 216 for each of the imaging pixels.

Relationship Between Defocus Amount and Image Shift Amount

The relationship between a defocus amount and an image shift amount of LF data (parallax image group) that can be obtained by the image sensor 107 of this embodiment will be described below.

Figure 6B:
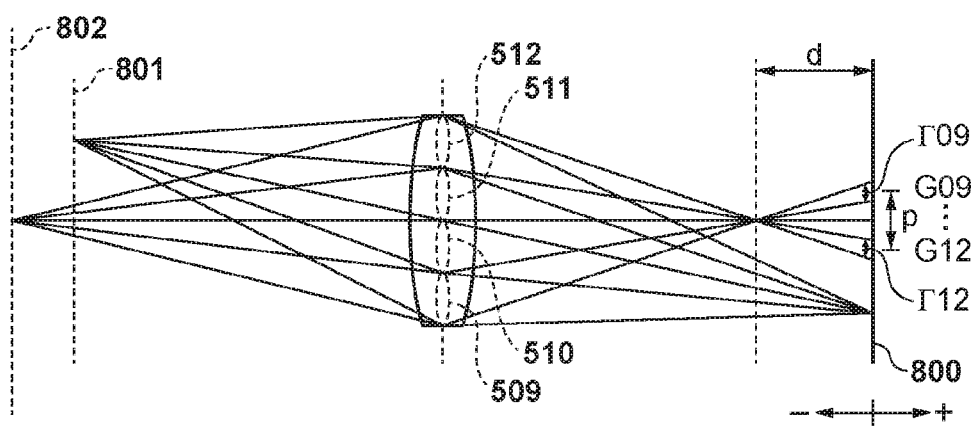

FIG. 6B shows a schematic diagram showing the relationship between a defocus amount and an image shift amount between parallax images. The image sensor is arranged in an image capture plane 800, and similarly to FIGS. 5 and 6A, the exit pupil of the imaging optical system is divided into $N_p$ areas, namely, the partial pupil areas 501 to 516 (here, divided into 16 areas).

A magnitude |d| of a defocus amount d is a distance from the image forming position of the object to the image capture plane 800. A case in which the defocus amount d is negative (d<0) refers to a front focusing state in which the image forming position of the object is on the object side relative to the image capture plane 800, and a case in which the defocus amount d is positive (d>0) refers to a rear focusing state in which the image forming position of the object is on the opposite side to the object relative to the image capture plane 800. In an in-focus state in which the image forming position of the object is in the image capture plane 800, the magnitude of the defocus amount d is 0. FIG. 6B shows an example in which an object 801 is in an in-focus state (d=0), and an object 802 is in a front focusing state (d<0). The front focusing state (d<0) and the rear focusing state (d>0) are collectively called a defocused state (|d|>0).

In a front focusing state (d<0), out of light beams from the object 802, light beams that have passed through the partial pupil areas 509 to 512 are collected at a position on the object side relative to the image capture plane 800. After that, the light beams widen to widths Γ09 to Γ12 centered on centroid positions G09 to G12 of the light beams, and forms blurred images on the image capture plane 800. The blurred images are received by the subpixels 209 to 212 constituting the imaging pixels arranged in the image sensor, and parallax images are generated. Therefore, in the image constituted by the signals of the subpixels 209 of the imaging pixels, an image of the object 802 that is blurred to a width Γ09 is recorded at the centroid position G09. In images constituted by the respective subpixels 210 to 212, images of the object 802 that are blurred to widths Γ10 to Γ12 are recorded at the centroid positions G10 to G12. Note that the same applies to light beams that have passed through the partial pupil areas 513 to 516, 505 to 508, and 501 to 504.

Blurring widths Γ (Γ01 to Γ16) of the object images increase substantially in proportion with the increase in the magnitude |d| of the defocus amount d. Similarly, a magnitude |p| of an image shift amount p between object images of parallax images also increases substantially in proportion with the increase in the magnitude |d| of the defocus amount d. The image shift amount p is a difference between centroid positions of the light beams, and, for example, the magnitude of the image shift amount between an image constituted by the output of the subpixels 209 and an image constituted by the output of the subpixels 212 is |G09-G12|.

Also in the rear focusing state (d>0), the same applies except that the object image deviation direction between the parallax images is opposite to that in the front focusing state. In the in-focus state (the defocus amount d=0), the centroid positions of the object images of the parallax images match, and image deviation does not occur (the image shift amount p=0).

Therefore, as the magnitude |d| of the defocus amount d increases, the magnitude of the image shift amount between a plurality of parallax images constituting LF data increases.

In this embodiment, it is possible to perform focus detection by an image capture plane phase difference method, by calculating an image shift amount between parallax images by a correlation operation, using the relationship in which as the magnitude |d| of the defocus amount d increases, the magnitude of the image shift amount between parallax images increases. Note that if necessary, focus detection may be performed using a focus detection apparatus that is configured separately from the image sensor 107 and employs a phase difference system, or focus detection by a contrast method may be performed using parallax images or captured images.

Refocusable Range

Figure 7:
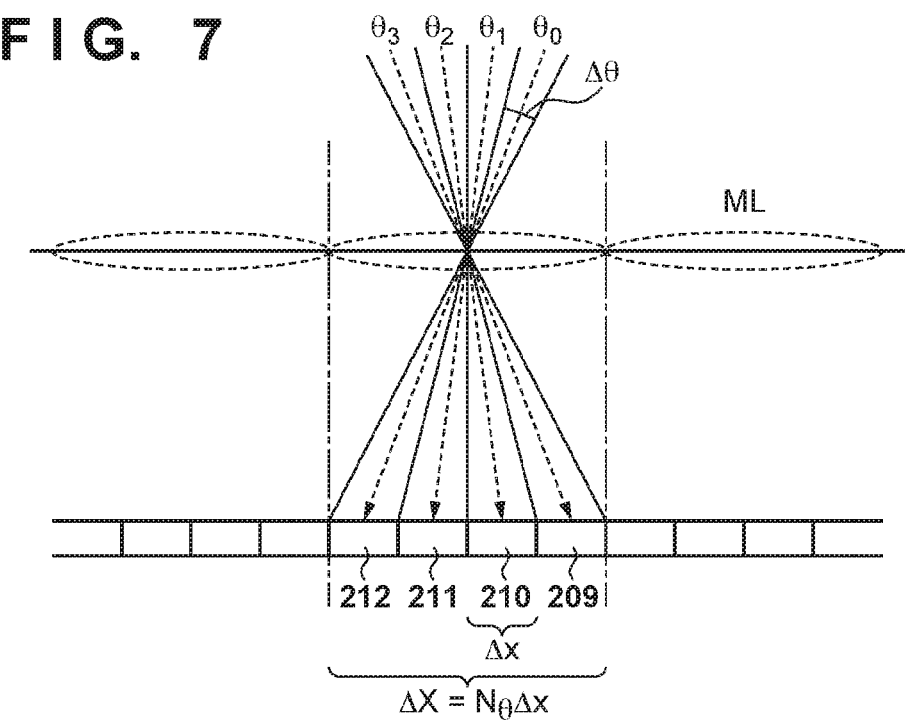
FIG. 7 is a schematic diagram showing a relationship between subpixels and angle information that can be obtained, according to the embodiments of the present invention.

Next, refocusing processing and a refocusable range will be described. First, angle information of incident light beams that can be obtained by subpixels will be described with reference to FIG. 7. Here, a subpixel period is denoted by Δx, the number of subpixels for each pixel is denoted by $N_p=N_\theta \times N_\theta$, and a pixel period is denoted by $\Delta X=N_\theta \Delta x$. Also, $\Delta \theta=\Theta/N_\theta$, where Δθ is the angular resolution, and Θ is the estimated angle of the exit pupil of the imaging optical system. If paraxial approximation is used, a relational expression $N_\theta F \approx 1/\Delta\theta$ substantially holds true, where F is an aperture value of the imaging optical system. Out of all the light beams that are incident on the pixels, light beams at incident angles $\theta_0$ to $\theta_3$ are respectively incident on the subpixels 212 to 209 each at the width of the angular resolution Δθ.

Figure 8:
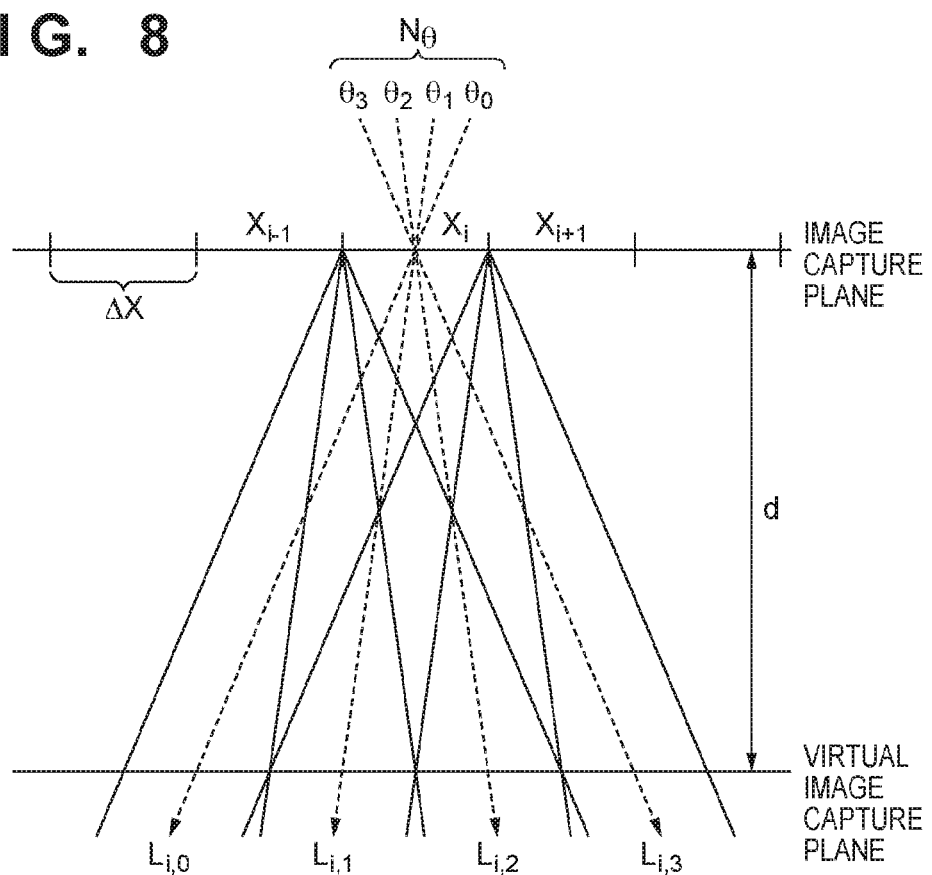
FIG. 8 is a schematic explanatory diagram of refocusing processing in the embodiments of the present invention.

FIG. 8 shows a schematic explanatory view of refocusing processing in this embodiment. FIG. 8 schematically shows, using line segments, pixels $X_i$ (i=0 to $N_{LF}-1$) of the image sensor that are arranged in the image capture plane. Light beams that are incident on an i-th pixel $X_i$ at an angle $\theta_a$ (a=0 to $N_\theta-1$) are received by each of the subpixels. The signals of the subpixels that received the light beams are denoted by $L_{i,a}$ (a=0 to $N_\theta-1$).

An image (refocused image) in the virtual image capture plane whose position on the optical axis is different from that in the image capture plane in which the image sensor is arranged can be generated from LF data obtained by shooting. Processing for generating a refocused image from LF data is called refocusing processing. A captured image and a refocused image generated from LF data are collectively called reconstructed images, and processing for generating a reconstructed image from LF data is called reconstruction processing.

A position at which light beams intersect the virtual image capture plane after being incident on the subpixels in each pixel in the refocused image capture plane and travelling in this state is determined from a distance d' between the image capture plane and the virtual image capture plane, and the incidence direction (the angle $\theta_a$) of the light beams. Therefore, an imaging signal obtained from an imaging pixel of the virtual imaging plane can be obtained by combining the signals of the subpixels that received, in the image capture plane, light beams that are incident on the pixel position. By generating, from LF data, the imaging signals of all the imaging pixels of the virtual imaging plane in this manner, a refocused image corresponding to the virtual imaging plane can be obtained. In actuality, the refocused image can be obtained by processing for shifting the positions of the parallax images and performing weighted addition. Here, coefficients used for the weighted addition form a group of coefficients whose values are all positive, and the sum of which is 1.

Figure 6C:
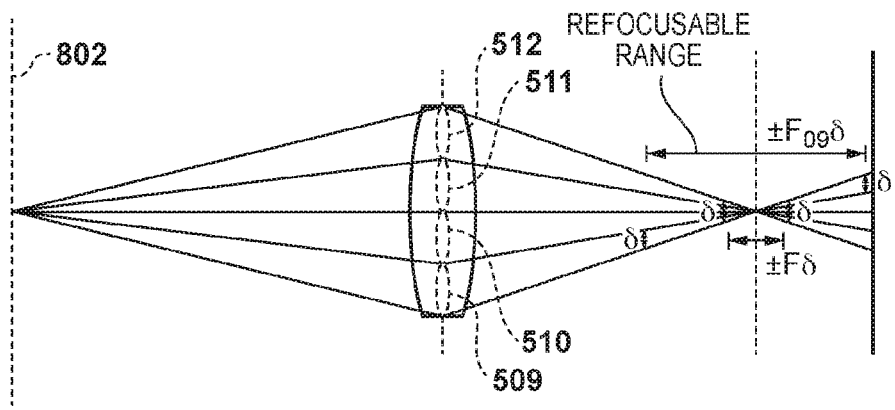

FIG. 6C shows a schematic explanatory view of a range in which refocusing is possible according to this embodiment. When a permissible circle of confusion is δ, and an aperture value of the imaging optical system is F, a depth of field at the aperture value F is ±Fδ. In contrast, regarding an effective aperture value $F_{09}$ ($F_{01}$ to $F_{16}$) of partial pupil areas that underwent $N_\theta \times N_\theta$ division and became smaller, $F_{09}=N_\theta F$ holds true. Therefore, the effective depth of field of a parallax image is $\pm N_\theta F\delta$, which is $N_\theta$ times deeper than in a case where pupil division is not performed, and the in-focus range widens $N_\theta$ times. Accordingly, the LF data obtained by shooting at the aperture value F of the imaging optical system is constituted by a group of parallax images that have the effective depth of field $\pm N_\theta F\delta$. Therefore, it is possible to obtain a refocused image that is in-focus in the virtual imaging plane at any distance in the range of the effective depth of field $\pm N_\theta F\delta$. This corresponds to readjusting (refocusing), after shooting, the in-focus range of the captured image (the distance of the object that is in focus). Therefore, the effective depth of field $\pm N_\theta F\delta$ is a range in which refocusing is possible. Regarding the outside of the range in which refocusing is possible, only a blurred object image is present in the LF data, and thus it is not possible to generate a refocused image corresponding to the virtual image capture plane positioned out of the range in which refocusing is possible (the focal distance cannot be changed to a distance outside the range in which refocusing is possible).

It can be said that a range in which refocusing is possible is a defocus amount during shooting that can be eliminated after shooting. Therefore, if the magnitude |d| of defocus during shooting is substantially in a range that satisfies Expression (1) below, it is possible to perform focusing by performing refocusing.

$$|d| \leq N_\theta F \delta \quad (1)$$

Note that the size of the permissible circle of confusion δ is determined by δ=2ΔX (the inverse number of a Nyquist frequency 1/(2ΔX) of the pixel period ΔX) or the like.

Reduction in LF Data Amount

As mentioned above, in the case where the number of divided pupil areas $N_p=N_\theta \times N_\theta$, if each of the subpixel signals that constitute LF data has the same bit depth or the same number of tones as normal captured image data, the data amount will be $N_p$ times the amount of the normal captured image data.

However, the signal of each of the pixels of a reconstructed image (a captured image or a refocused image) is generated by combining the subpixel signals for the number of divided pupil areas $N_p$. Combining subpixel signals for generating one pixel signal is weighted addition that uses coefficients whose sum is 1. Therefore, assuming that a bit depth necessary for the reconstructed image is a first number of bits b1 (b1 bits/pixel), if subpixel signals are generated at a bit depth of a second number of bits b2, which is expressed by $$b2 \geq b1 - (\log_2 N_p) \qquad (2),$$

the bit depth (the number of tones) necessary for the reconstructed image can be maintained. Moreover, if b2<b1, the LF data amount can be reduced.

In Expression (2), if the first and second numbers of bits b1 and b2 are respectively replaced with the numbers of tones t1 (=$b1^2$) and t2 (=$b2^2$), $$t2 \geq t1/N_p \qquad (3).$$

In this case as well, if the number of tones t2<the number of tones t1, the LF data amount can be reduced. Note that the pupil division number $N_p$ used in Expressions (2) and (3) above does not necessarily need to match the number of the photoelectric conversion portions included in the unit pixel of the image sensor 107. For example, in the case of adding and reading a plurality of subpixel signals, the number of subpixel signals per unit pixel after the addition will be the number of divided pupil areas or partial pupil areas $N_p$. In other words, a reduction amount of LF data amount is desirably variable in accordance with the number of added subpixel signals.

Note that in the case of generating a reconstructed image from subpixel signals whose data amount has been reduced in this manner, weighting coefficients used for the combining are changed in accordance with the reduction in data amount. For example, a ratio of weighting coefficients in the case where the data amount is not reduced to an average value (1/$N_p$) can be used. Note that this is an example, and the weighting coefficients may be changed by other methods.

A configuration may be adopted in which the camera 100 of this embodiment includes a first record mode in which a captured image is recorded as normal image data, and a second record mode in which a captured image is recorded as LF data, and one of the modes can be selected via an operation of the operation switch 132, for example. As shown in FIG. 9A, for example, when generating recording data, the CPU checks whether the first record mode or the second record mode is selected (step S901). In the case where the first record mode is selected, the CPU 121 combines, in units of imaging pixels, subpixel signals read out via the image sensor driving circuit 124, and generates captured image data having a predetermined bit depth (the first number of bits) or a predetermined number of tones (the first number of tones) (step S902). In the case where the second record mode is selected, the CPU 121 generates light field data in which the subpixel signals read out via the image sensor driving circuit 124 are indicated by a predetermined bit depth (the second number of bits) or a predetermined number of tones (the second number of tones) (step S903). Note that the CPU 121 does not need to perform all of the conversions of the bit depth or the number of tones. A hardware circuit for the conversions or the like may be provided.

When the number of subpixels (the number of divided exit pupils) obtained by dividing the exit pupil of the imaging optical system is $N_p$, by setting the second bit number to an integer that is greater than or equal to the first number of bits−($\log_2 N_p$), the tone properties of a reconstructed image generated from LF data can be made greater than or equivalent to those of the captured image data. Moreover, the LF data amount can be reduced by setting the second number of bits to less than the first number of bits.

Alternatively, by making the second number of tones greater than or equal to the first number of tones/the number of divided pupil areas ($N_p$), the tone properties of the reconstructed image generated from the LF data can be made greater than or equivalent to those of the captured image data. Also, by making the second number of tones smaller than the first number of tones, the LF data amount can be reduced.

The captured image data or LF data that has been generated may be recorded in a predetermined file format in the recording medium 133, for example. Note that the bit depth or the number of tones of the LF data can be recorded as header information of the file. Accordingly, in an apparatus that uses LF data, a reconstructed image can be correctly generated.

Note that in an example shown in FIG. 9A, the conversion of the bit depth or the number of tones is performed by the CPU 121 as a part of operations for generating recording data. However, the conversion of the bit depth or the number of tones can be performed in another operations. For example, the conversion may be performed in operations for generating digital signals in the A/D converters in the image sensor 107. More specifically, the bit depth or the number of tones can be controlled in accordance with an operational mode so as to be in the range indicated by Expression (2) or (3), when voltage signals, which are analog signals, are input to the A/D converter provided for each of the columns of the image sensor 107. Operations of the image sensor 107, such as a readout mode and the like are controlled by the image sensor driving circuit 124, and thus the operations of the image sensor 107 can be easily changed based on the number of divided pupil areas $N_p$. Furthermore, the A/D converters provided in the image sensor 107 are single slope type A/D converters, and thus there is also an effect of enabling the conversion time to be reduced by reducing the bit depth or the number of tones.

The camera of this embodiment has an image sensor in which a plurality of imaging pixels each having a plurality of subpixels are arranged, and each of the plurality of subpixels receives a light beam that has passed through a different one of a plurality of partial pupil areas that were obtained by dividing the exit pupil of the imaging optical system into predetermined numbers. Moreover, the camera includes a first record mode in which imaging signals obtained by combining signals of a plurality of subpixels for each imaging pixel are recorded as captured image data, and a second record mode in which signals of a plurality of subpixels are recorded as LF data without being combined. The camera sets, in the second record mode, the bit depth or the number of tones of the subpixel signals to less than the bit depth or the number of tones of the imaging signals that are recorded in the first record mode. Therefore, the LF data amount can be reduced by more than in the case of recording with the same bit depth or number of tones as the captured image data. Furthermore, by determining the bit depth or the number of tones in the second record mode by taking the number of divided pupil areas into consideration, it is possible to record the LF data that enables generation of a reconstructed image having a bit depth or the number of tones that is greater than or equivalent to that of the captured image data that is recorded in the first record mode. Note that in the case of reducing the bit depth or the number of tones, the reduction amount may be determined in accordance with the bit depth (for example, 8 bits and 14 bits) of the recording format that is used when recording the data to the recording medium 133, or the number of display tones of the display device 131.

Other Embodiment

In the above-described embodiment, a case was described in which LF data indicating the spatial distribution and angular distribution of the intensity of light beams that have passed through partial pupil areas obtained by dividing the exit pupil of the imaging optical system into a predetermined numbers is generated through reading out from the image sensor. However, recorded LF data can also be used. For example, if the bit depth b1 or the number of tones t1 of recorded LF data is reduced, the LF data amount can be reduced.

Figure 9B:
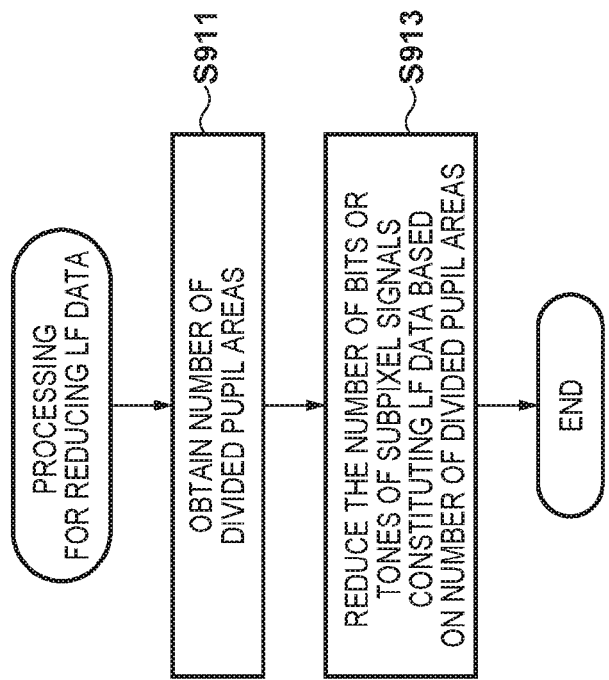
FIGS. 9A and 9B are flowcharts related to LF data reduction processing in the embodiments of the present invention.
Figure 9A:
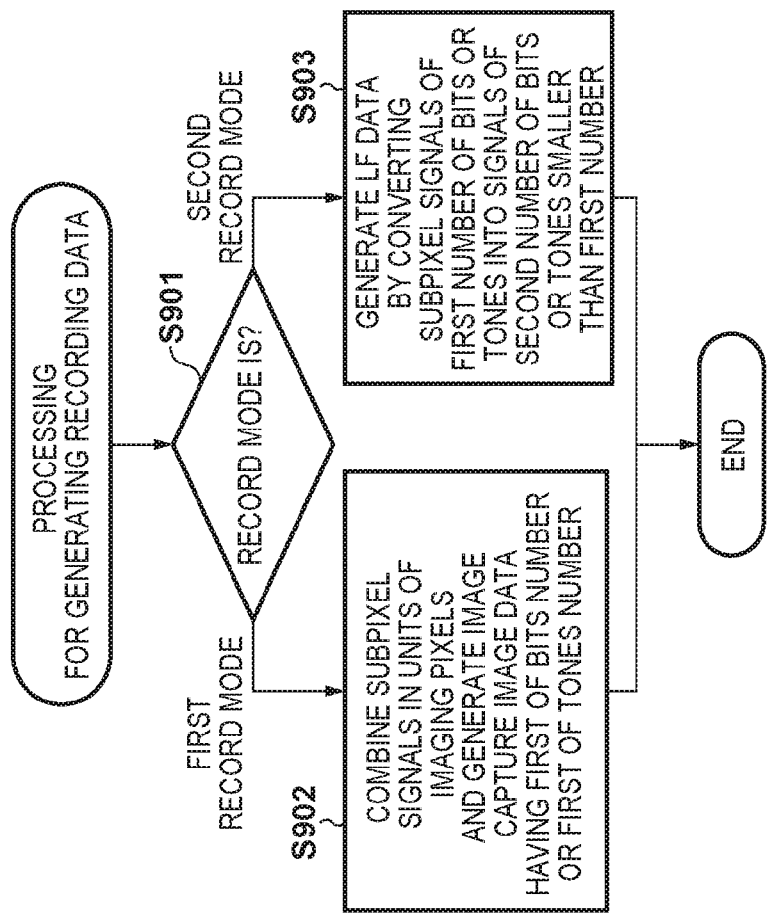

In this case, for example, as shown in FIG. 9B, the CPU 121 obtains the number of divided pupil areas or the number of subpixels corresponding to the LF data from header information of an LF data file, for example (step S911). At this time, the bit depth or the number of tones necessary for a reconstructed image may also be obtained, if necessary or possible to obtain.

The CPU 121 then reduces the bit depth or the number of tones of signals (subpixel signals) constituting LF data that has not been reduced, to a value determined based on the number of pupil division or the number of divided pupil areas (step S913). Specifically, the CPU 121 reduces the number of bits before the reduction to a value (>0) that is less than $\log_2 N_p$, or the number of tones before the reduction to a number that is greater than or equal to 1/(the number of the divided pupil areas) and less than the number of tones before the reduction.

If the bit depth or the number of tones necessary for a reconstructed image has been obtained in step S911, the bit depth or the number of tones after the reduction can be determined so as to be smaller than the obtained bit depth or number of tones.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-194398, filed on Sep. 30, 2015, which is hereby incorporated by reference herein in its entirety.

What is claimed is:

1. An image processing apparatus comprising:
a processor and a memory which function as:
an obtaining unit configured to obtain data that is based on light beams that have passed through partial pupil areas obtained by dividing an exit pupil of an imaging optical system into a predetermined number Np; and
a reduction unit configured to reduce a bit depth or a number of tones of signals constituting the data based on the predetermined number Np,
wherein the reduction unit reduces the bit depth to a value (>0) that is less than $\log_2 Np$, or reduces the number of tones to be greater than or equal to 1/Np.

2. An image capture apparatus comprising:
an image sensor that generates data indicating a spatial distribution and an angular distribution of an intensity of light beams that have passed through partial pupil areas obtained by dividing an exit pupil of an imaging optical system into a predetermined number Np; and
an image processing apparatus comprising a processor and a memory which function as:
an obtaining unit configured to obtain the data generated by the image sensor; and
a reduction unit configured to reduce a bit depth or a number of tones of signals constituting the data based on the predetermined number Np,
wherein the reduction unit reduces the bit depth to a value (>0) that is less than $\log_2 Np$, or reduces the number of tones to be greater than or equal to 1/Np.

3. The image capture apparatus according to claim 2, wherein
a plurality of imaging pixels are arranged in the image sensor,
each of the plurality of imaging pixels includes a plurality of subpixels, and
each of the plurality of subpixels receives a light beam that has passed through a different one of the partial pupil areas.

4. An image processing method executed by an image processing apparatus, the method comprising:
obtaining data that is based on light beams that have passed through partial pupil areas obtained by dividing an exit pupil of an imaging optical system into a predetermined number Np; and reducing a bit depth or a number of tones of signals constituting the data based on the predetermined number Np, wherein the reducing reduces the bit depth to a value (>0) that is less than $\log_2 Np$, or reduces the number of tones to be greater than or equal to $1/Np$.

5. A non-transitory computer-readable storage medium storing a program for causing a computer to function as an image processing apparatus comprising:

an obtaining unit configured to obtain data that is based on light beams that have passed through partial pupil areas obtained by dividing an exit pupil of an imaging optical system into a predetermined number Np; and a reduction unit configured to reduce a bit depth or a number of tones of signals constituting the data based on the predetermined number Np, wherein the reduction unit reduces the bit depth to a value (>0) that is less than $\log_2 Np$, or reduces the number of tones to be greater than or equal to $1/Np$.

* * * * *